(12) United States Patent
Yamada et al.

(10) Patent No.: US 11,738,848 B2
(45) Date of Patent: Aug. 29, 2023

(54) AERIAL VEHICLE

(71) Applicant: NTT DOCOMO, INC., Tokyo (JP)

(72) Inventors: Wataru Yamada, Tokyo (JP); Hiroyuki Manabe, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 115 days.

(21) Appl. No.: 17/416,764

(22) PCT Filed: Dec. 25, 2019

(86) PCT No.: PCT/JP2019/050937
§ 371 (c)(1),
(2) Date: Jun. 21, 2021

(87) PCT Pub. No.: WO2020/138214
PCT Pub. Date: Jul. 2, 2020

(65) Prior Publication Data
US 2022/0073183 A1 Mar. 10, 2022

(30) Foreign Application Priority Data
Dec. 28, 2018 (JP) .................. 2018-246940

(51) Int. Cl.
*B64B 1/44* (2006.01)
(52) U.S. Cl.
CPC ..................... *B64B 1/44* (2013.01)
(58) Field of Classification Search
CPC ..................... B64B 1/44
See application file for complete search history.

(56) References Cited

U.S. PATENT DOCUMENTS

| 5,071,090 A | * | 12/1991 | Takahashi | B64B 1/02 244/128 |
| 5,509,624 A | * | 4/1996 | Takahashi | B64B 1/66 244/115 |
| 2003/0132343 A1 | | 7/2003 | Kurose | |

(Continued)

FOREIGN PATENT DOCUMENTS

| EP | 1591356 A2 | * 11/2005 | ............... B64B 1/06 |
| EP | 1591356 A2 | 11/2005 | |

(Continued)

OTHER PUBLICATIONS

Extended European Search Report issued in corresponding European Patent Application No. 19903126.1, dated Jan. 24, 2022.

(Continued)

*Primary Examiner* — Justin M Benedik
(74) *Attorney, Agent, or Firm* — DILWORTH IP, LLC (57) ABSTRACT

Provided is an aerial vehicle having a structure in which a rotating body has been excluded from a portion that can be touched by a user during flight. An aerial vehicle includes: a balloon unit; a control unit provided at the bottom of the balloon unit; and a plurality of micro-mechanisms (micro blowers), each of which blows out air. The micro blowers have a structure in which a vibrating member is vibrated in a space in communication with a plurality of openings, thereby blowing out, through a second opening, the air that has flowed into the space through a first opening. The control unit controls the micro blowers to change the position or the attitude of the aerial vehicle.

10 Claims, 4 Drawing Sheets

(56) References Cited

U.S. PATENT DOCUMENTS

2005/0236519 A1\* 10/2005 Handley ................... B64B 1/06
244/128
2019/0002093 A1 1/2019 Muramatsu et al.

FOREIGN PATENT DOCUMENTS

| JP | 2002347697 A | 12/2002 |
|----|--------------|---------|
| JP | 2003205897 A | 7/2003 |
| JP | 2009097393 A | 5/2009 |
| JP | 201127079 A | 2/2011 |
| JP | 2011027079 A | 2/2011 |
| JP | 6245566 B1 | 12/2017 |
| JP | 2018150002 A | 9/2018 |
| WO | 2017022209 A1 | 2/2017 |

OTHER PUBLICATIONS

International Search Report issued in corresponding PCT Application No. PCT/JP2019/050937, dated Mar. 10, 2020.
Office Action issued by the European Patent Office in EP Patent Application No. 19903126.1 dated Feb. 15, 2023.
Notice of Reasons for Refusal issued in Japanese Patent Application No. 2020-563371, dated Jun. 27, 2023.
Notice of Reasons for Refusal issued by the Japanese Patent Office in JP 2020-563371, dated Apr. 25, 2023.

\* cited by examiner

AERIAL VEHICLE

TECHNICAL FIELD

The present invention relates to a structure of an aerial vehicle.

BACKGROUND

Unmanned aerial vehicles called drones are becoming widespread. A drone flies under rotation of a propeller, which is a rotatable body. For this reason, there is a risk that a user's fingers or hair may be caught in the propeller, causing injury. There have been cases where the risk of such injury causes reluctance in a user to use a drone.

Thus, there have been proposed drones in which a frame is placed around a propeller such that a user does not inadvertently touch the propeller (refer to, for example, Japanese Patent No. 6245566). However, even with such a structure, as long as the propeller is exposed in the drone, a possibility of a user's fingers or hair becoming caught in the propeller is not zero.

SUMMARY OF THE INVENTION

An object of the present invention is to provide an aerial vehicle having a structure in which a rotating body is excluded from a portion that can be touched by a user during flight.

To this end, the present invention provides an aerial vehicle including: a balloon unit filled with a gas that has a lighter specific gravity than air; a blowing mechanism that vibrates a vibrating member to blow air to flow through a first opening into a space where the vibrating member is provided and out of a second opening; and a control unit that controls the blowing mechanism to change a position or an attitude of aerial vehicle.

The blowing mechanism may have a plurality of blower units, a detector that detects a position or attitude of the aerial vehicle may be further provided, and the control unit may control the plurality of blower units according to a detected position or attitude of the aerial vehicle.

The direction of blow from the blower units may be in the same direction.

The direction of blow from the blower units may be in one direction and also in another opposing direction thereto.

The direction of blow from the blower units may be different to each other.

The aerial vehicle may include a gravity center controlling mechanism that moves the center of gravity of the aerial vehicle.

The aerial vehicle may include: an estimation unit that estimates at least either the amount of a gas filled in the balloon unit or the amount of the gas filled in the balloon unit that has leaked outside from the balloon unit; and a separating mechanism that separates, from the aerial vehicle, an object mounted in the aerial vehicle by an amount corresponding to the estimated amount.

The aerial vehicle may include: a vibrating member that is in contact with the balloon unit; and a sound-emitting control unit that controls the vibration of the vibrating member that is in contact with the balloon unit and vibrates a surface of the balloon unit to emit sound.

According to the present invention, an aerial vehicle can be provided which has a structure in which a rotating body is excluded from a portion that can be touched by a user during flight.

DETAILED DESCRIPTION

Figure 1:
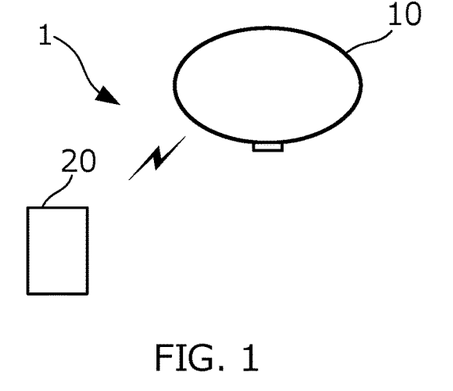
FIG. 1 is a diagram illustrating the structure of an entire system according to an embodiment of the present invention.

FIG. 1 is a diagram illustrating an example of the configuration of a flight system 1. The flight system 1 includes an unmanned aerial vehicle 10 referred to as a drone, and a remote controller 20 that functions as a remote controller for an operator to pilot the aerial vehicle 10. The aerial vehicle 10 and the remote controller 20 perform wireless communication in accordance with a predetermined wireless communication system. The aerial vehicle 10 receives a radio signal based on a piloting operation performed by the operator using the remote controller 20, and controls the operation thereof in accordance with the radio signal. In the present embodiment, description will be given of an example in which the aerial vehicle 10 is piloted using a radio signal that directly reaches the aerial vehicle 10 from the remote controller 20 without going through a network. Alternatively, however, the aerial vehicle 10 may be controlled using a radio signal transmitted by the remote controller 20 through a network. Further, the aerial vehicle 10 is not limited to so-called manual flight by the remote controller 20 described above and may alternatively perform so-called automatic flight, in which the aerial vehicle 10 itself autonomously flies. This automatic flight may or may not involve communication.

Figure 2A:
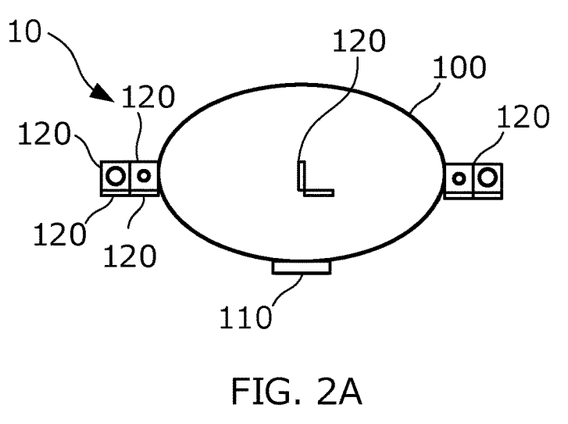
FIG. 2A is a side view of an aerial vehicle in flight according to the present invention.
Figure 2B:
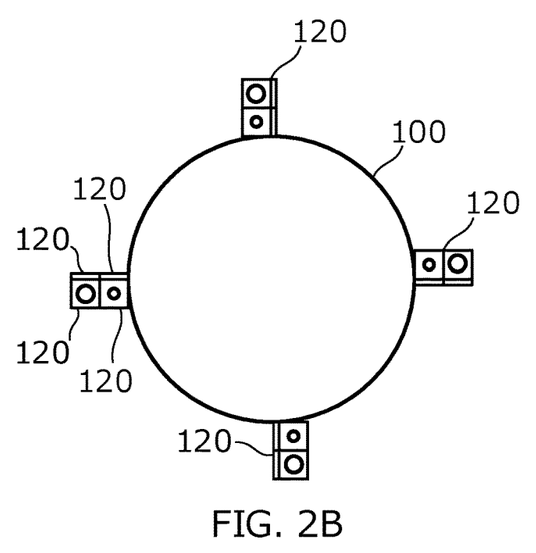
FIG. 2B is a plan view of the aerial vehicle in flight viewed from above according to the present invention.

FIG. 2 is a side view of the aerial vehicle 10 in flight, and FIG. 3 is a plan view of the aerial vehicle 10 in flight as viewed from above. In the present embodiment, the approximate shape of the aerial vehicle 10 as viewed from the side is elliptical, and the approximate shape of the aerial vehicle 10 as viewed from above is circular. However, the shape of the aerial vehicle 10 is not limited to this example, and may be a substantially spherical or rectangular parallelepiped shape, or another shape.

The aerial vehicle 10 includes a balloon unit 100, which has an elliptical shape when viewed from the side and a circular shape when viewed from above, a control unit 110 provided at the bottom of the balloon unit 100, and a blowing mechanism composed of a plurality of micro blower units 120 (hereinafter referred to as the "micro blowers 120"), each of which blows out air. The balloon unit 100 is formed of, for example, a nylon-aluminum vapor-deposited film, and is a bag-like object that forms a sealed space. The sealed space inside the balloon unit 100 is filled with a gas having a lighter specific gravity than a gas (air) existing in the space where the aerial vehicle 10 flies (for example, hydrogen gas or helium gas for air).

The micro blowers 120 have a structure disclosed in, for example, Japanese Patent Application Laid-Open No. 2011-27079. The micro blower disclosed in Japanese Patent Application Laid-Open No. 2011-27079 is a blower for releasing heat generated inside the housing of a portable electronic device to the outside or for supplying oxygen necessary to generate electricity by a fuel cell. In the present embodiment, a blowing mechanism having a structure represented by the micro blower disclosed in Japanese Patent Application Laid-Open No. 2011-27079 is used as a source of the propulsive force of the aerial vehicle 10.

The micro blower disclosed in Japanese Patent Application Laid-Open No. 2011-27079 includes: a blower main body; a diaphragm with an outer periphery thereof fixed to the blower main body and performs bending vibration in response to an applied electrical signal; a first blower chamber formed between the blower main body and the diaphragm; a first wall which constitutes one wall surface of the first blower chamber and faces the diaphragm; a first opening that is formed at a portion of the first wall facing the diaphragm and provides communication between an inside and outside of the first blower chamber; a second wall provided on a side opposite the first blower, with the first wall therebetween; a second opening formed at a portion of the second wall facing the first opening; and an inflow passage through which a fluid is introduced between the first wall and the second wall from the outside. In the micro blower that vibrates the diaphragm to thereby discharge, through the second opening, the fluid introduced through the inflow passage, a third wall for forming a second blower chamber between the third wall and the diaphragm is provided at a portion of the blower main body on the opposite side from the first blower chamber, with the diaphragm therebetween, a third opening that provides communication between the outside and the second blower chamber is formed in the blower main body or the third wall, and the inflow passage is connected to the second blower chamber such that the fluid that has flowed into the second blower chamber through the third opening as the diaphragm vibrates can be supplied to the inflow passage.

On the other hand, the blowing mechanism in accordance with the present invention may have any structure as long as the vibrating member is vibrated in a space in communication with a plurality of openings including the first opening and the second opening, thereby blowing out, through the second opening, the air that has flowed into the space through the first opening. The vibrating member is, for example, a piezoelectric element. The piezoelectric element minutely vibrates when an alternating current is applied thereto.

Figure 3A:
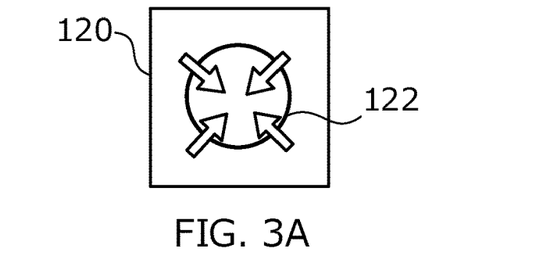
FIG. 3A is a plan view of a micro blower viewed from the back surface side according to the present invention.

Each of the micro blowers 120 is shaped as, for example, a rectangular, thin plate. Each of openings 121 and 122 is circular, and the diameter of the opening 122 for inflow (the first opening) is larger than the diameter of the opening 121 for blowing out (the second opening). As illustrated in FIG. 3A, the opening 122 for air inflow (the first opening) is provided in the back surface of the micro blower 120. As indicated by the arrows in FIG. 3A, ambient air flows into the inflow opening 122.

Figure 3B:
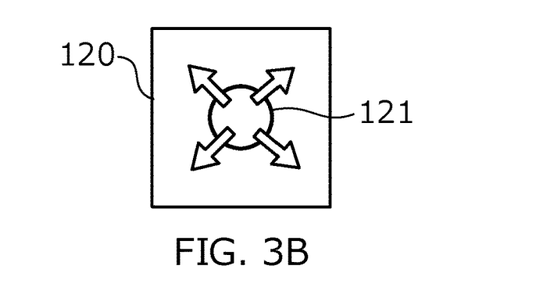
FIG. 3B is a plan view of the micro blower viewed from the front surface side according to the present invention.

Meanwhile, as illustrated in FIG. 3B, the air outflow opening 121 (the second opening) is provided in the front surface of the micro blower 120. As indicated by the arrows in FIG. 3B, the air that has flowed in through the inflow opening 122 is blown out to the surroundings through the outflow opening 121.

As illustrated in FIGS. 2A and 2B, a plurality of micro blowers (four in this case) are defined as one set, and a plurality of micro blower groups constituting the individual sets are placed on the surface of the balloon unit 100. In the micro blower group of one set, the micro blowers 120 are combined such that two micro blowers 120 are placed adjacent to each other such that a direction of blow of one is opposite to the direction of blow of the other, and similarly, two micro blowers 120 are placed adjacent to each other such that a direction of blow of one is opposite to the direction of blow of the other, and the plate surfaces thereof are in contact at an angle of 90 degrees. The micro blower groups constituting the individual sets are fixed, by a method such as bonding, to the front surface of the balloon unit 100 at positions equivalent to 0 o'clock, 3 o'clock, 6 o'clock, and 9 o'clock as viewed on a clock from above.

In FIGS. 2A and 2B, the plurality of micro blowers 120 are placed such that the direction of blow caused by each micro blower 120 is different from each other. However, the directions of blow from the plurality of the micro blowers 120 are not limited to the example of FIGS. 2A and 2B, and alternatively may all be in the same directions, or in one direction and an opposing direction thereto.

The control unit 110 is fixed at a position corresponding to the lowermost position of the balloon unit 100 by a method such as bonding. Each of the micro blowers 120 and the control unit 110 are connected through each communication line wired along the front surface or the back surface of the balloon unit 100. The control unit 110 sends control signals to each of the micro blowers 120 through the communication line so as to perform processing such as changing the position or the attitude of the aerial vehicle 10 by controlling each of the micro blowers 120. The force of the airflow generated by each of the micro blowers 120 is extremely small. However, the micro blowers 120 can nonetheless provide a propulsive force that is sufficient for the aerial vehicle 10 to move through air in a state that buoyancy is obtained from helium gas or the like, that is, if there is no object that applies friction to the aerial vehicle 10. Thus, the aerial vehicle 10 obtains buoyancy from a gas having a specific gravity that is lighter than that of air, and uses the micro blowers 120 as the source of the propulsive force in the air.

Figure 4:
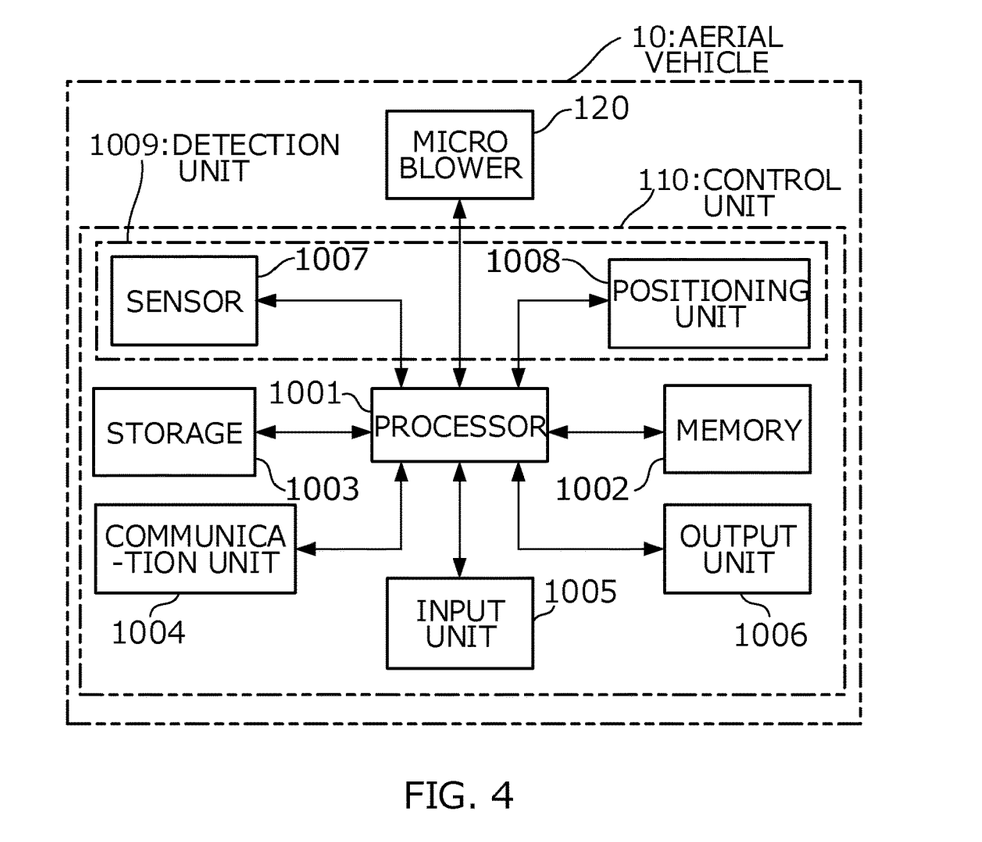
FIG. 4 is a diagram illustrating the electrical configuration of the aerial vehicle according to the present invention.

FIG. 4 is a diagram illustrating the electrical configuration of the aerial vehicle 10. In the aerial vehicle 10, the control unit 110 is physically configured as a computer unit including a processor 1001, a memory 1002, a storage 1003, a communication unit 1004, an input unit 1005, an output unit 1006, a sensor 1007, a positioning unit 1008, and buses connecting these constituents. These units are operated by power supplied from a battery, which is not illustrated. In the following description, the term "unit" can be interpreted as a circuit, a device, a unit or the like. The hardware of the aerial vehicle 10 may be configured to include one or a plurality of the devices illustrated in the drawing, or may be configured to exclude some of the devices.

The processor 1001 operates, for example, an operating system, to control the entire computer. The processor 1001 may be comprised of a central processing unit (CPU) that mainly includes an interface with a peripheral device, a control device, an arithmetic device, and a register.

The processor 1001 reads a program (program code), a software module, data, and the like from at least one of the storage 1003 and the communication unit 1004 into the memory 1002, and carries out various types of processing according thereto. As the program, a program is used that when executed by the computer causes the computer to perform at least a part of an operation, which will be described later. The functional blocks of the aerial vehicle 10 may be stored in the memory 1002, and implemented by a control program run in the processor 1001. Various types of processing may be performed by one processor 1001, or may be simultaneously or sequentially performed by two or more processors 1001. The processor 1001 may be mounted with one or more chips. The programs may be transmitted to the aerial vehicle 10 through a telecommunication circuit.

The memory 1002 is a computer-readable recording medium and may be comprised of at least one of, for example, a ROM (Read Only Memory), an EPROM (Erasable Programmable ROM), an EEPROM (Electrically Erasable Programmable ROM), and a RAM (Random Access Memory). The memory 1002 may be referred to as a register, a cache, a main memory (main storage device), or the like. The memory 1002 can store a program (program code), a software module, and the like that can be executed to carry out a method according to the present embodiment.

The storage 1003 is a computer-readable recording medium, and may be comprised of at least one of, for example, an optical disk such as a CD-ROM (Compact Disc ROM), a hard disk drive, a flexible disk, a magneto-optical disk (e.g., a compact disk, a digital versatile disk, a Blu-ray (registered trademark) disk), a smart card, a flash memory (e.g., a card, a stick, or a key drive), a floppy (registered trademark) disk, and a magnetic strip. The storage 1003 may be referred to as an auxiliary storage device.

The communication unit 1004 is, for example, hardware (transmitting/receiving device) for performing communication by radio signals, and is also referred to as, for example, a network device, a network controller, a network card, or a communication module. For example, a transmitting/receiving antenna, an amplifying unit, a transmitting/receiving unit, a transmission line interface or the like may be implemented by the communication unit 1004. The transmitting/receiving unit may be mounted such that a transmission control unit and a receiving unit are physically or logically separated.

The input unit 1005 is an input unit (e.g., a key, a switch, or a button) that accepts input from outside. The output unit 1006 is an output unit (e.g., a display, a speaker, or an LED lamp) that performs output to outside. The input unit 1005 and the output unit 1006 may be integrally configured (e.g., a touch panel).

The sensor 1007 detects, for example, the attitude of the aerial vehicle 10. The sensor 1007 includes a sensor group of, for example, a gyro sensor, an accelerator sensor, an electromagnetic (azimuth) sensor, and an ultrasonic sensor.

The positioning unit 1008 measures the three-dimensional position of the aerial vehicle 10. The positioning unit 1008 is, for example, a GPS (Global Positioning System) receiver, and measures the position of the aerial vehicle 10 on the basis of GPS signals received from a plurality of satellites. The positioning unit 1008 may include an atmospheric sensor (i.e., an altitude sensor). In the present embodiment, a detection unit 1009 that detects the attitude or position of the aerial vehicle 10 is implemented by the sensor 1007 and the positioning unit 1008 described above.

The aerial vehicle 10 may be configured by including any of the following hardware: a microprocessor, a digital signal processor (DSP: Digital Signal Processor), ASIC (Application Specific Integrated Circuit), PLD (Programmable Logic Device), FPGA (Field Programmable Gate Array), and the like.

In the aerial vehicle 10, the various types of control by the control unit 110 are implemented by loading software for execution (a program) into hardware such as the processor 1001, the memory 1002, and the like, to cause the processor 1001 to perform calculations, control of communication by the communication unit 1004, and control of at least one of reading and writing data in the memory 1002 and the storage 1003.

More specifically, the control unit 110 stores software that includes an algorithm for driving each micro blower in such a way as to control an amount of air that is blown in response to a radio signal received from the remote controller according to a user operation at any position and attitude of the aerial vehicle 10. The control unit 110 executes this software to control the driving of the plurality of micro blowers according to the position or the attitude of the aerial vehicle 10. This changes the position or the attitude of the aerial vehicle 10 as intended by the user.

According to the embodiment described above, it is possible to provide an aerial vehicle having a structure in which a rotating body is excluded from any portions that can be touched by a user during flight. Consequently, it is possible to reduce a risk that the user's fingers, hair, or the like becomes caught in the rotating body. Further, as compared with a case where the rotating body is mounted on the aerial vehicle, noise associated with the rotation of the rotating body is not generated, so that a quieter flight can be achieved.

Modified Example

The embodiment described above is merely an example of implementing the present invention, and may be modified as described below. Further, the embodiment and the modified examples described below may be combined as appropriate and implemented.

Modified Example 1

Figure 5A:
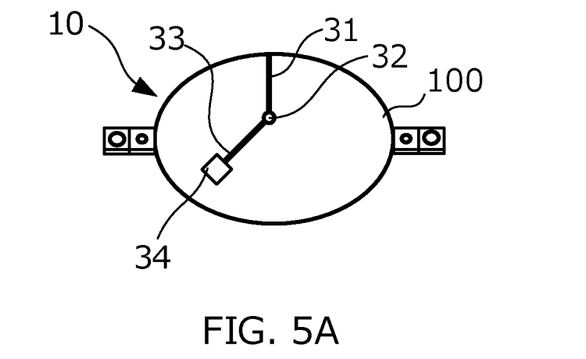
FIGS. 5A and 5B are conceptual diagrams illustrating a gravity center controlling mechanism, which is an internal structure of an aerial vehicle according to a modified example of the present invention.
Figure 5B:
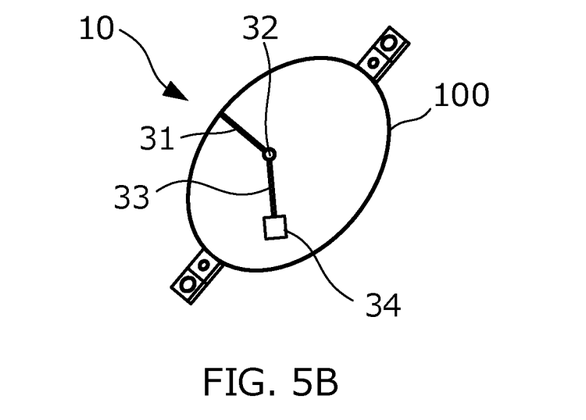

The aerial vehicle 10 may be provided with a gravity center controlling mechanism that moves the center of gravity of the aerial vehicle 10 to enable the aerial vehicle 10 to move in the air. As illustrated in FIGS. 5A and 5B, in the sealed space inside a balloon unit 100, an arm 31 having one end thereof fixed to the inner wall of the balloon unit 100 by bonding or the like, a servomotor 32 connected to the other end of the arm 31, an arm 33 having one end thereof connected to the servomotor 32, and a weight 34 provided on the other end of the arm 33 together constitute the gravity center controlling mechanism. The servomotor is comprised of two servomotors and is adapted to enable the angle between the longitudinal direction of the arm 31 and the longitudinal direction of the arm 33 to be adjusted at any angle. The mass of the weight 34 is sufficiently large in comparison with the sum of mass of the arm 31, the servomotor 32, and the arm 33. As illustrated in FIG. 5A, when a control unit 110 controls the servomotor 32 to adjust the angle between the longitudinal direction of the arm 31 and the longitudinal direction of the arm 33 to a certain angle, the center of gravity of the aerial vehicle 10 transitions in the direction of the weight 34, thus causing the aerial vehicle 10 to adopt an inclined attitude such that the longitudinal direction of the arm 33 approaches the vertical direction, as illustrated in FIG. 5B. Thus, the positions of the micro blowers 120 on the space change from FIG. 5A to FIG. 5B, so that the aerial vehicle 10 behaves differently depending on control of the airflow of the micro blowers 120. The control unit 110 stores software that includes an algorithm for how to drive each micro blower to control an amount of air blown in response to a radio signal received from a remote controller in accordance with a user operation at any position and attitude of the aerial vehicle 10. The control unit 110 executes this software to control the driving of the plurality of micro blowers in accordance with a position or the attitude of the aerial vehicle 10. Thus, the position or the attitude of the aerial vehicle 10 is changed as intended by the user.

Modified Example 2

Although the inside of the balloon unit 100 is a sealed space, minute amounts of a gas filled in the sealed space nonetheless gradually leak to the outside of the balloon unit 100 over time. Consequently, buoyancy acting on the aerial vehicle 10 decreases over time. For this reason, the aerial vehicle 10 may be provided with an estimation unit that estimates at least one of the amount of the gas filled in the balloon unit 100 and the amount of the gas filled in the balloon unit 100 leaking to the outside from the balloon unit 100, and a separation mechanism that separates a substance from the aerial vehicle 10 by an amount corresponding to the estimated amount. The substance separated from the aerial vehicle 10 is, for example, a liquid contained in a tank mounted to the aerial vehicle 10. The tank is provided with a spray mechanism that sprays the liquid therefrom into the air. The control unit 110 stores a function of how much buoyancy acting on the aerial vehicle 10 decreases over time, and by use of the spray mechanism sprays into the air an amount of liquid from the tank that corresponds to the decrease in buoyancy over time. This makes it possible to maintain the buoyancy acting on the aerial vehicle 10 at a constant value even if the gas filled in the balloon unit 100 leaks to the outside over time. The substance separated from the aerial vehicle 10 to the outside is not limited to a liquid, but may be a solid (e.g., an aggregate of minute grains) or a gas (a gas having a specific gravity heavier than air). Further, the method of separation is not particularly specified, and a method of releasing under gravity a solid substance from the aerial vehicle 10 may be used.

Modified Example 3

The aerial vehicle 10 may include a vibrating member that is in contact with the balloon unit 100, and a sound-emitting control unit that controls vibration of the vibrating member, which is in contact with the balloon unit 100, and vibrates the surface of the balloon unit 100 to emit sound. The vibrating member is, for example, a piezoelectric element, and is fixed to the surface of the balloon unit 100 by a predetermined method. When the control unit 110 controls the vibration of the vibrating member, the vibration created by the vibrating member is amplified on the surface of the balloon unit 100, and a sound is emitted from the entire balloon unit 100.

Modified Example 4

Figure 6:
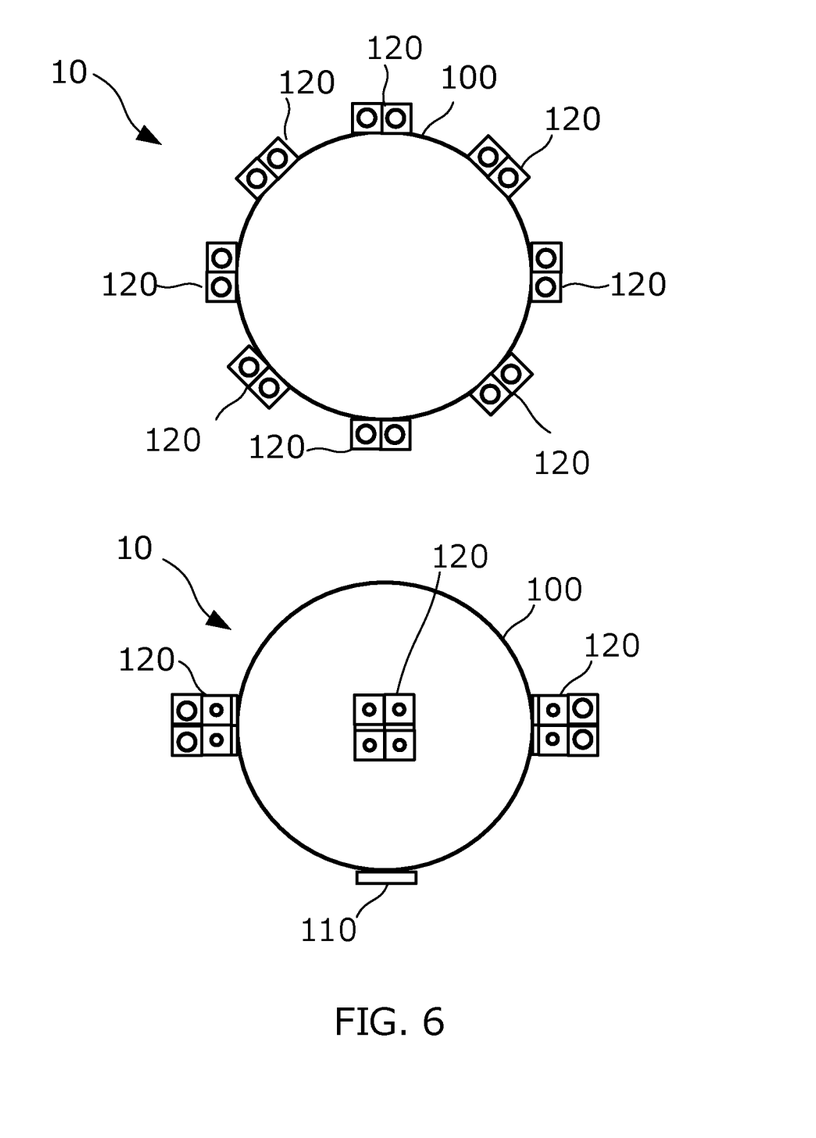
FIG. 6 is a side view illustrating example arrangements of the micro blowers of an aerial vehicle according to a modified example of the present invention.

How micro blowers 120 are arranged in relation to the aerial vehicle 10, and how directions of blow from by micro blowers 120 are designed are not limited to the examples described in the embodiment, but can be determined at need. More specifically, the directions of blow from the plurality of micro blowers 120 are not limited to the example in FIG. 2, and may all be in the same direction, or may be in one direction and in an opposing direction thereto. The upper part of FIG. 6 discloses an example in which the shape of the aerial vehicle 10 is substantially spherical and the directions of blow from by the micro blowers 120 are all in the same direction. The lower part of FIG. 6 discloses another configuration example. Further, not limited to these examples, the directions of blow caused from the micro blowers 120 may all be inclined with respect to the vertical direction of the aerial vehicle 10.

Other Modified Examples

The modes/embodiments described in the present disclosure may be applied to at least one of systems using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE802.11 (Wi-Fi (registered trademark)), IEEE802.16 (WiMAX (registered trademark)), IEEE802.20, UWB (Ultra-WideBand), Bluetooth (registered trademark), and other appropriate systems, and next-generation systems extended on the basis of these systems. The modes/embodiments may also be applied to a combination of a plurality of systems (e.g., a combination of at least one of LTE and LTE-A and 5G).

Although the present disclosure has been described in detail above, it will be obvious to those skilled in the art that the present disclosure is not limited to the embodiments described in the present disclosure. The present disclosure can be implemented in modified or altered modes without departing from the intent and the scope of the present disclosure as defined by the claims. Therefore, the description of the present disclosure is for illustrative purposes only and is not limitative of the present disclosure.

Software, regardless of whether referred to as software, firmware, middleware, microcode, hardware description language, or any other designation, should be broadly interpreted to mean instruction, instruction set, code, code segment, program code, program, subprogram, software module, application, software application, software package, routine, subroutine, object, executable file, execution thread, procedure, function, and the like.

Further, software, instructions, information, and the like may be transmitted and received through a transmission medium. For example, if software is transmitted from a website, a server or other remote source by using at least one of wired technology (a coaxial cable, an optical fiber cable, a twisted pair, a digital subscriber line (DSL, and the like) and wireless technology (infrared, microwave, and the like), then at least one of these wired technology and wireless technology is included within the definition of transmission medium.

The information, signals, and the like described in the present disclosure may be represented using any of a variety of different techniques. For example, data, instructions, commands, information, signals, bits, symbols, chips, and the like that may be referred to throughout the above description may be represented by voltage, current, electromagnetic wave, magnetic field or magnetic particle, light field or photon, or any combination of these.

The terms described in the present disclosure and the terms necessary for understanding the present disclosure may be replaced with terms having the same or similar meanings. For example, at least one of a channel and a symbol may be a signal (signaling). Further, a signal may be a message. Further, a component carrier (CC) may be referred to as a carrier frequency, a cell, a frequency carrier, or the like.

The terms "system" and "network" used in the present disclosure are interchangeably used.

The terms "connected" and "coupled" or any variations thereof mean any direct or indirect connection or coupling between two or more elements, and can include a case where one or more intermediate elements exist between two elements that are "connected" or "coupled" with each other. The coupling or connection between the elements may be physical, logical, or a combination of these. For example, "connection" may be replaced by "access." When used in the present disclosure, it can be considered that two elements are "connected" or "coupled" with each other by using at least one of one or more wires, cables and printed electrical connections, and by using electromagnetic energy having wavelengths in a radio frequency range, microwave range, and optical (both visible and invisible) range as some non-limiting and non-comprehensive examples.

The phrase "on the basis of" used in the present disclosure does not mean "solely on the basis of" unless otherwise specified. In other words, the phrase "on the basis of" means both "solely on the basis of" and "at least on the basis of."

Any reference to elements using designations such as "first" and "second" used in the present disclosure does not limit the quantity or order of those elements in general. These designations can be used in the present disclosure as a convenient way to distinguish two or more elements. Therefore, references to the first and the second elements do not mean that only two elements can be adopted, or that the first element must precede the second element in one way or another.

In the present disclosure, if, for example, articles such as a, an, and the, in English are added in translation, the present disclosure may include cases where nouns following these articles are plural.

In the present disclosure, the term "A and B are different" may mean "A and B are different from each other." The term may also mean that "each of A and B is different from C." Terms such as "separate" and "combined" may be interpreted in the same way as "different."

DESCRIPTION OF REFERENCE NUMERALS

1: flight system
10: aerial vehicle
100: balloon unit
110: control unit
120: micro blower
121: outflow opening
122: inflow opening
1001: processor
1002: memory
1003: storage
1004: communication unit
1005: input unit
1006: output unit
1007: sensor
1008: positioning unit
20: remote controller
31: arm
32: servomotor
33: arm
34: weight.

The invention claimed is:

1. An aerial vehicle comprising:
a balloon filled with a gas that has a lighter specific gravity than air;
a micro-blower including a body having a chamber with a first opening and a second opening and a vibrating member disposed with the chamber of the body, wherein the vibrating member vibrates to force air to flow through the first opening into the chamber and out of the second opening to provide a propulsive force; and
a control unit that controls the micro-blower to alter the propulsive force to change at least one of a position and an attitude of the aerial vehicle.

2. The aerial vehicle according to claim 1, further comprising a detector that detects a position or attitude of the aerial vehicle, wherein:
the micro-blower includes a plurality of micro-blowers; and
the control unit controls the plurality of micro-blowers to alter the propulsive force according to at least one of a detected position and attitude of the aerial vehicle.

3. The aerial vehicle according to claim 2,
wherein a direction of blow from the micro-blowers is in the same direction.

4. The aerial vehicle according to claim 2,
wherein the direction of blow from the micro-blowers is in one direction and is also in another opposing direction thereto.

5. The aerial vehicle according to claim 2,
wherein the direction of blow from the micro-blowers is different from each other.

6. The aerial vehicle according to claim 1, including a gravity center controlling mechanism that moves a center of gravity of the aerial vehicle.

7. The aerial vehicle according to claim 1, including:
an estimation unit that estimates at least either an amount of a gas filled in the balloon or an amount of the gas filled in the balloon that has leaked outside from the balloon, and
a separating mechanism that separates, from the aerial vehicle, a substance mounted in an object to the aerial vehicle by an amount corresponding to the estimated amount.

8. The aerial vehicle according to claim 1, including:
a second vibrating member that is in contact with the balloon; and
a sound-emitting control unit that controls the vibration of the second vibrating member that is in contact with the balloon and vibrates a surface of the balloon to emit sound.

9. The aerial vehicle according to claim 8, wherein the second vibrating member is a piezoelectric element.

10. The aerial vehicle according to claim 1, wherein the vibrating member is a piezoelectric element.

* * * * *